UNITED STATES PATENT OFFICE 2,320,745

ANTIOXIDANTS

Philip T. Paul, Naugatuck, Conn., assignor to United States Rubber Company, New York, N. Y., a corporation of New Jersey No Drawing. Application April 30, 1941,
Serial No. 391,142

9 Claims. (Cl. 260—809)

This invention relates to improvements in antioxidants.

An object of the invention is to provide chemicals which may be used per se for retarding the deterioration of organic substances which tend to deteriorate by absorption of oxygen from the air, such as rubber or allied gums, artificial rubber-like materials such as neoprene (polychloroprene), and buna (polyolefines), unsaturated fatty oils such as unsaturated vegetable oils, essential oils, petroleum oils and their derivatives, such as gasoline, soaps, aldehydes, paints, and the like. Further objects will be apparent from the following description.

According to the invention, the organic substance has incorporated therein a chemical having the probable general formula

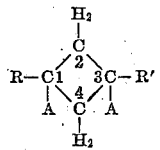

where R and R' are aryl groups, at least one of which is further substituted by an aryl-amino group; and A represents a saturated or unsaturated aliphatic radical such as methyl, ethyl, propyl, allyl, etc.

Exemplary of such compounds are:

1-(p-anilino phenyl) 3-phenyl 1,3 dimethyl cyclobutane
1-(o-anilino phenyl) 3-phenyl 1,3 dimethyl cyclobutane
1-(m-anilino phenyl) 3-phenyl 1,3 dimethyl cyclobutane
1-(p-beta naphthyl amino phenyl) 3-phenyl 1,3 dimethyl cyclobutane
1-(p-anisidino phenyl) 3-phenyl 1,3 dimethyl cyclobutane
1,3-di (p-anilino phenyl 1,3 dimethyl cyclobutane
1-(p-anilino phenyl) 3-p-xenyl 1,3 dimethyl cyclobutane
1-(p-anilino phenyl) 3-p-tolyl 1,3 diethyl cyclobutane
1-(p-alpha naphthyl amino phenyl) 3-beta naphthyl 1,3 dipropyl cyclobutane
1-(p-anilino phenyl) 3-p-hydroxy phenyl 1,3 dimethyl cyclobutane
1-(p-anilino naphthyl) 3-phenyl 1,3 dimethyl cyclobutane
1-(p-anilino phenyl) 3-naphthyl 1,3 dibutyl cyclobutane
1-(p-toluidine phenyl) 3-phenyl 1,3 dimethyl cyclobutane The chemicals have special and outstanding properties in connection with the preservation of rubber and vulcanized rubber goods.

The following examples are given to illustrate the preparation of the chemicals and the effectiveness of their use in rubber. The parts are by weight.

Example 1

1,3 diphenyl 1,3 dimethyl cyclobutane, 50 grams, is dissolved in 50 ccs. acetic acid and nitrated at 40–45° C. with a mixture of 28.6 cc. 70% $HNO_3$ and 28 cc. concentrated $H_2SO_4$. The reaction mixture is poured into water and the organic material extracted with benzene. The benzene extract is washed, dried and the benzene evaporated. The residue on vacuum fractionating gives two fractions.

I.—B. R. 123–125° at 4 mm. mercury pressure—unchanged hydrocarbon.

II.—B. R. 160–165° at 4 mm. mercury pressure—nitro derivative.

Fraction II, on recrystallization from ligroin, gives 9 grams p-nitro 1,3 diphenyl 1,3 dimethyl cyclobutane, M. P. 178–180° C.

The nitro derivative (19.5 grams) is reduced with 20 grams zinc dust and 1 gram ammonium chloride in 150 ccs. 80% alcohol and 60 cc. dioxane. 1-(p-amino phenyl) 3 phenyl 1,3 dimethyl cyclobutane is obtained in a 72% yield, B. P. 160–165° at 3 mm. mercury pressure. Its acetyl derivative, prepared by the action of acetic anhydride, is not crystalline.

1-(p-acetamino phenyl) 3 phenyl 1,3-dimethyl cyclobutane (14.5 grams) is refluxed with 6.7 cc. iodobenzene and 8.5 grams potassium carbonate for 11 hours in 25 cc. methyl hexyl carbinol. After removal of the acetyl radical with alcoholic potassium hydroxide, the 1-(p-anilino phenyl) 3 phenyl 1,3 dimethyl cyclobutane is obtained as a viscous oil, B. P. 200–210° at 3 mm. mercury pressure. Yield 11 grams. This chemical is identified as chemical A in the table below.

Example 2

1,3 diphenyl 1,3 dimethyl cyclobutane is nitrated and the whole nitration product is reduced with a large excess of zinc and ammonium chloride. The product is dissolved in benzene and shaken several times with 6 N hydrochloric acid to remove the amines. The acid extracts are neutralized and the mixed amines isolated. The mixture of amines (13.9 grams) consisting of 1-(o-amino phenyl) 3-phenyl 1,3 dimethyl cyclobutane, 1-(m-amino phenyl) 3-phenyl 1,3 dimethyl cyclobutane, and 1-(p-amino phenyl)

3-phenyl 1,3 dimethyl cyclobutane is fused with 8 grams beta naphthol and 2.5 grams potassium bisulfate for four hours at 190° C.

The product is dissolved in benzene and washed with dilute caustic, dilute acid and water. The residue after the removal of the benzene boils 250–360° at 3 mm. mercury pressure and consists of 1-(o-beta naphthyl amino phenyl) 3-phenyl 1,3-dimethyl cyclobutane, 1-(m-beta naphthyl amino phenyl) 3-phenyl 1,3 dimethyl cyclobutane, and 1-(p-beta naphthyl amino phenyl) 3-phenyl 1,3 dimethyl cyclobutane. This chemical is referred to as chemical B in the table below.

*Example 3*

The following master batch or recipe is used:

| | Parts |
|---|---|
| Pale crepe | 100 |
| Zinc oxide | 10 |
| Lithopone | 60 |
| Whiting | 60 |
| Zinc soap of cocoanut oil acids | 0.50 |
| Sulphur | 3 |
| Tetramethyl thiuram monosulfide | 0.15 |

Chemical A is incorporated in the ratio of 1 part to 100 parts of rubber based on the pale crepe. Cures are carried out for 10, 20 and 30 minutes at 30 pounds per square inch steam. Percent remaining tensiles before and after ageing 96 hours in oxygen are as follows:

| | Control | Chemical A |
|---|---|---|
| Unaged | 100 | 100 |
| Aged | 4 | 67 |

It was observed that chemical A is substantially non-staining to lacquered cloth held next to the rubber and only slightly discoloring when the stock is exposed to sunlight.

*Example 4*

Chemical B is tested in a tire tread stock of the composition:

| | Parts |
|---|---|
| Smoked sheet | 100 |
| Carbon black | 45 |
| Zinc oxide | 5 |
| Pine tar | 3.50 |
| Zinc soap of cocoanut oil acids | 3.50 |
| Sulphur | 3.00 |
| Mercaptobenzothiazole (accelerator) | 1. |

Chemical B is incorporated in the ratio of 1 part to 100 parts of the smoked sheet. Cures are made for 45, 60, 75 and 90 minutes at 30 pounds steam pressure. Percent remaining tensiles before and after ageing 96 hours in oxygen are:

| | Control | Chemical B |
|---|---|---|
| Unaged | 100 | 100 |
| Aged | 14 | 52 |

It is to be understood that the invention may be applied to the preservation of natural rubber compositions as well as artificially prepared rubber compositions including reclaimed rubbers and latices of such rubber composition.

It is also to be understood that other desired filling and compounding ingredients may be incorporated along with the preservative for example in the case of rubber there may be incorporated other accelerators, softeners, etc.

The anti-oxidant may be incorporated in any type of rubber composition such as those used for automobile tires and tubes, hose, belting, sheet and thread rubber, rubberized fabrics, molded goods, boots, and shoes, etc., where vulcanized in a mold, in open steam, in hot air, or in the cold by the so-called acid process. The proportion of the anti-oxidant may vary from about 0.1% to 5%, although either smaller or greater proportions may be found useful. If the material to which it is added is a liquid such as rubber cement or an oil, the anti-oxidant may be dissolved there in a suitable small proportion. The anti-oxidant may be incorporated into solid substances by milling or mastication and prepared for incorporation into dispersions or solutions either in powder, paste, or solution form, or applied in such forms for incorporation by diffusion to the surfaces of vulcanized or unvulcanized rubber goods.

Having thus described my invention, what I claim and desire to protect by Letters Patent is:

1. A method of preserving organic substances which tend to deteriorate by absorption of oxygen from the air which comprises incorporating therein an anti-oxidant consisting of a compound having the general formula

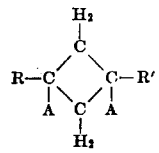

where R and R' are aryl groups at least one of which is further substituted by an aryl-amino group; and A represents an aliphatic hydrocarbon group.

2. A method of preserving organic substances which tend to deteriorate by absorption of oxygen from the air which comprises incorporating therein a compound having the general formula

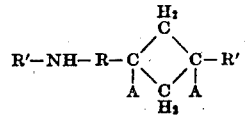

where R' represents an aryl group; R is an arylene group; and A is an aliphatic hydrocarbon radical.

3. The method which comprises incorporating in a rubber composition an anti-oxidant consisting of a 1,3-diaryl 1,3-dialkyl cyclobutane in which at least one of the aryl groups is directly connected in the para position, to the secondary amino nitrogen atom of the group —NH—R where R is an aryl radical.

4. The method which comprises incorporating in a rubber composition an anti-oxidant consisting of a 1,3-diaryl, 1,3-dialkyl cyclobutane in which one of the aryl groups is directly connected in the para position, to the secondary amino nitrogen atom of the group —NH—R where R is an aryl radical.

5. An organic substance which tends to deteriorate by absorption of oxygen from the air containing 1-(p-anilino phenyl) 3-phenyl 1,3 dialkyl cyclobutane.

6. An organic substance which tends to deteriorate by absorption of oxygen from the air containing 1-(p-beta naphthyl amino phenyl) 3-phenyl 1,3 dialkyl cyclobutane.

7. A method of preserving organic substances which tend to deteriorate by absorption of oxygen from the air which comprises incorporating therein an anti-oxidant consisting of a 1,3-diaryl 1,3-dialkyl cyclobutane in which at least one of the aryl groups is directly connected in the para position, to the secondary amino nitrogen atom of the group —NH—R where R is an aryl radical.

8. A method of preserving organic substances which tend to deteriorate by absorption of oxygen from the air which comprises incorporating therein an anti-oxidant consisting of a 1,3-diaryl 1,3-dialkyl cyclobutane in which one of the aryl groups is directly connected in the para position, to the secondary amino nitrogen atom of the group —NH—R where R is an aryl radical.

9. A rubber composition containing 1-(p-anilino phenyl) 3-phenyl 1,3 dialkyl cyclobutane.

PHILIP T. PAUL.